US012717972B2

(12) United States Patent
Shemer et al.

(10) Patent No.: US 12,717,972 B2
(45) **Date of Patent: *Aug. 25, 2026**

(54) SECURE STORAGE UNIT REPLACEMENT AND LOCKING SYSTEM AND METHOD OF USING THE SAME

(71) Applicant: Dell Products L.P., Round Rock, TX (US)

(72) Inventors: Jehuda Shemer, Kfar Saba (IL); Naor Radami, Shokeda (IL); Stav Sapir, Beer Sheba (IL); Amihai Savir, Newton, MA (US); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 71 days.

This patent is subject to a terminal disclaimer.

(21) Appl. No.: 18/965,227

(22) Filed: Dec. 2, 2024

(65) Prior Publication Data

US 2025/0094644 A1 Mar. 20, 2025

Related U.S. Application Data

(63) Continuation of application No. 17/648,640, filed on Jan. 21, 2022, now Pat. No. 12,210,657.

(51) Int. Cl.
*G06F 21/70* (2013.01)
*G07C 9/00* (2020.01)

(52) U.S. Cl.
CPC ......... *G06F 21/70* (2013.01); *G07C 9/00658* (2013.01)

(58) Field of Classification Search
CPC .. G06F 21/70; G07C 9/00658; G07C 9/00896
See application file for complete search history.

(56) References Cited

U.S. PATENT DOCUMENTS

2004/0012921 A1* 1/2004 Hidaka ................ G11B 33/022
2016/0035166 A1* 2/2016 Amdahl ............. G06Q 20/4014 235/382

* cited by examiner

*Primary Examiner* — Izunna Okeke
(74) *Attorney, Agent, or Firm* — Fogarty LLP

(57) ABSTRACT

According to one embodiment, a secure storage unit replacement and locking system includes computer-executable instructions to receive a request to remove one of the storage units from the enclosure, and generate a key, wherein the key includes information for identifying the one storage unit to be removed. When the key is presented at the enclosure, the instructions receive information associated with the key when the key is located at the disk enclosure, determine which one of the plurality of storage units are to be unlocked by the key, and unlock the one storage unit according to the determination.

16 Claims, 4 Drawing Sheets

SECURE STORAGE UNIT REPLACEMENT AND LOCKING SYSTEM AND METHOD OF USING THE SAME

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware, and software components that may be configured to process, store, and communicate information and may include one or more computer systems, data storage systems, and networking systems.

Advancements in networking have enabled the rise in pools of configurable computing resources. A pool of configurable computing resources may be formed from a physical infrastructure including physical resources, such as may be found in large data centers. The physical infrastructure can include a number of resources having processors, memory, storage, networking, power, cooling, and the like. System management consoles (e.g., OpenManage Enterprise) of these data centers can aggregate a selection of the resources to form servers and/or computing hosts. These hosts can subsequently be allocated to execute and/or host system software, such as Operating Systems (OSs), Virtual Machines (VMs), applications, or the like. The amount of data storage in data centers continues to increase, often at exponential levels, thus requiring larger physical storage resources in currently deployed data centers.

Regarding data storage, a variety of different technologies may be used. Data may be stored on storage units, such as hard disks, Solid State Drives, and flash memory devices, such as USB devices. Different storage technologies, nevertheless, such as a flash memory device, may fail primarily due to wear out or usage, such as after performing a certain number of write cycles to store data on the flash memory device. For example, hard disk drives typically use moving parts, such as motors, disk heads, and servos to control those heads that may wear out over time. As such, storage units, such as hard disk devices have a limited serviceable lifespan and need to be replaced at ongoing intervals to ensure the proper operation of the datacenter.

SUMMARY

According to one embodiment, a secure storage unit replacement and locking system includes computer-executable instructions to receive a request to remove one of the storage units from the enclosure, and generate a key, wherein the key includes information for identifying the one storage unit to be removed. When the key is presented at the enclosure, the instructions receive information associated with the key when the key is located at the disk enclosure, determine which one of the plurality of storage units are to be unlocked by the key, and unlock the one storage unit according to the determination.

According to another embodiment, method includes the steps of receiving a request to remove one of a plurality of storage units from an enclosure in which each hard disk is configured with a lock to selectively restrict removal of its respective storage unit from the disk enclosure, and generating a key that includes information for identifying the one storage unit to be removed. When the key is located at the disk enclosure, the method performs the steps of receiving information associated with the key, determining which one of the plurality of storage units are to be unlocked by the key, unlocking the one storage unit according to the determination.

According to yet another embodiment, a computer program product that comprises a computer readable storage medium with instructions stored thereon, that when executed by a processor, performs the steps of receiving a request to remove one of a plurality of storage units from an enclosure in which each hard disk is configured with a lock to selectively restrict removal of its respective storage unit from the disk enclosure, and generating a key that includes information for identifying the one storage unit to be removed. When the key is located at the disk enclosure, the method performs the steps of receiving information associated with the key, determining which one of the plurality of storage units are to be unlocked by the key, and unlocking the one storage unit according to the determination.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
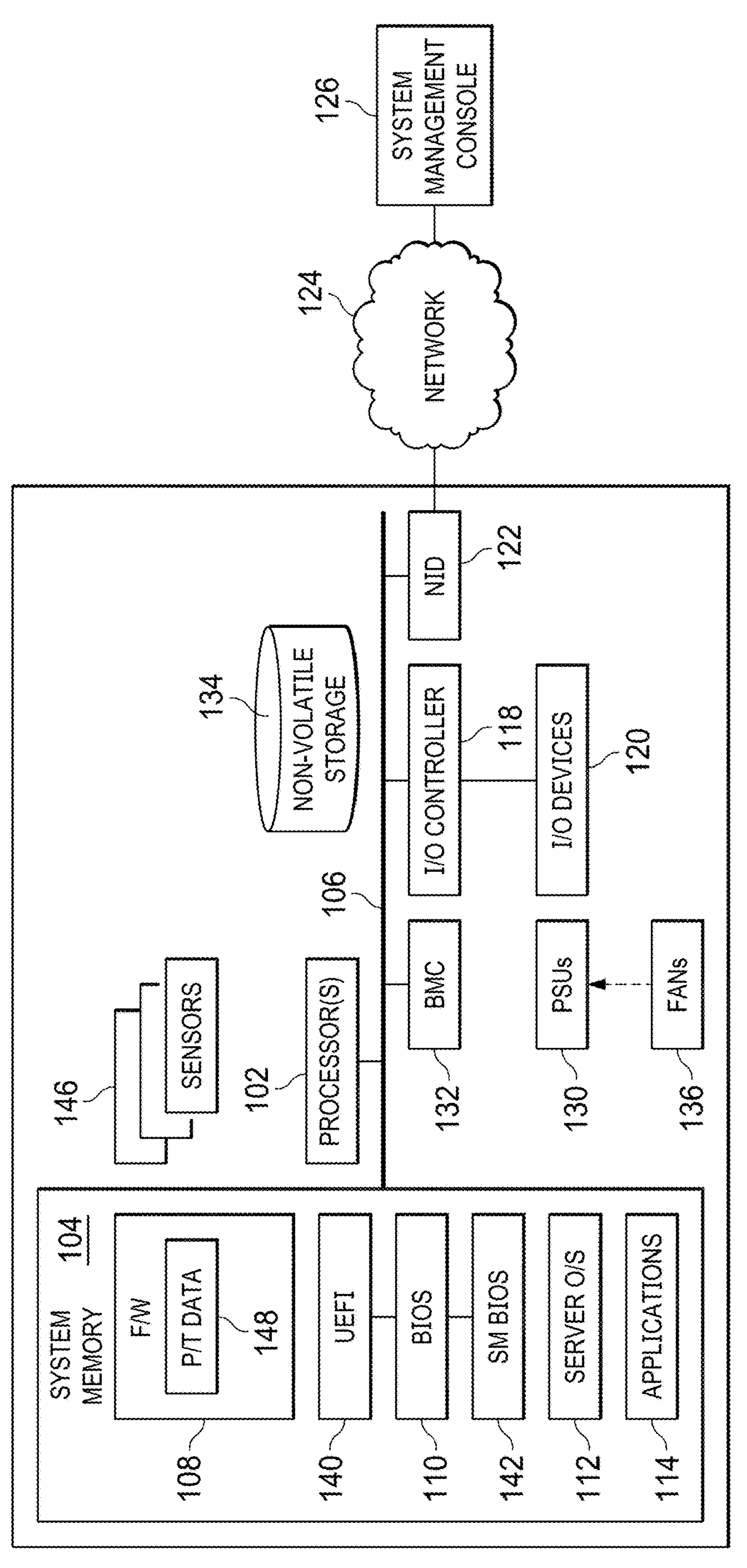
FIG. 1 is a block diagram of examples of components of an Information Handling System (IHS) that may be used to implement a secure storage unit replacement and locking system and method according to one embodiment of the present disclosure.

Embodiments of the present disclosure provide a secure storage unit replacement and locking system and method that restricts access to the individual storage units in a disk enclosure, or other suitable computing environment (e.g., computing cluster, server farm, data center, etc.) so that they may only be removed and replaced as a coordinated sequence with a systems management console that manages the operation of the disk enclosure. The secure storage unit replacement and locking system and method functions with a systems management console to generate a key (e.g., a QR code) that may be used by administrative personnel to unlock certain storage units that are slated for removal and/or replacement. Those storage units that are not slated for removal and/or replacement remain locked so that the administrative personnel cannot inadvertently or illicitly remove and replace the wrong storage unit in the disk enclosure.

Computing devices in modern data centers are commonly mounted in specific configurations on server racks for which a number of computing modules, such as server trays, server chassis, server sleds, server blades, and the like are positioned and stacked relative on top of each other within the server racks. Rack mounted systems allow for vertical arrangement of the computing modules to use space efficiently. Generally, each computing module can be slid into and out of the server rack (i.e., a sled), and various cables (e.g., input/output cables, network cables, power cables, etc.) can connect to the computing modules at the front or rear of the rack. Each computing module can contain one or more computer servers or may hold one or more computer server components. For example computing modules can include hardware circuitry for processing, storage, network controllers, disk drives, cable ports, power supplies, etc. Each computing module may require an individual corresponding input/output interface for communicating with a network, other computing modules, or various computer server components.

Modern day computing resources are provided by large computing environments that may include server farms, computer clusters, individual computing devices, and/or data centers. Computing environments are generally associated with large organizations, such as business enterprises to educational institutions such as universities. In many cases, larger organizations may manage multiple server farms over a diverse geographical region. Nevertheless, management of such large, diversified computing environments are typically provided by remotely configured system management consoles. OpenManage Enterprise is one example of a system management console provided by Dell Technologies, which cost-effectively facilitates comprehensive lifecycle management for the computing devices of distributed computing environments from one console.

Management of these large computing environments often requires numerous administrative users to properly maintain their operation. Additionally, such large computing environments often require numerous storage resources (i.e., non-volatile storage) to meet the ever increasing demands of consumers. For example, a typical data center may be deployed with over 1,000 storage units (e.g., hard disk drives, solid state drives, etc.), yet such storage units normally have a serviceable life span of approximately 3 to 4 years. Thus, the administrative personnel are often required to service and/or replace several storage units each day.

Conventionally, when a user (e.g., datacenter administrator) gains access to disk enclosures in a data center, they are free to swap in and out disks without limitation. Apart from malicious activity, these users may also inadvertently misreplace an incorrect storage unit if tight logistical procedures are not maintained by the data center's administrative staff. To solve this problem, fault light indicators have been added to storage units so when they are engaged in a Disk Array Enclosure (DAE), the user can better identify a faulty drive for replacement without accidentally removing the wrong drive by accident. Yet accidents do indeed occur because even with the fault light indicators, data center administrators have been known to improperly remove and replace an incorrect storage unit resulting in customer data loss. Nonetheless, mistakes can happen, and moreover; once someone gains physical access to a data center, they can replace drives at will whether maliciously or not using conventional storage unit management techniques. Use of data at rest encryption means that drives that are removed may be relatively safe from data exposure, but it also means that authorized users of that data are also inhibited from access to the storage unit itself when improperly removed.

As will be described in detail herein below, embodiments of the present disclosure provide a solution to one or more of these problems by implementing a secure storage unit replacement and locking system and method that ensures that the correct drive (and only that drive) is allowed to be removed and replaced. Additionally, the secure storage unit replacement and locking system and method prevents removing storage units with little or no restrictions, and ensures the correct drive is replaced. It is also contemplated that embodiments of the present disclosure may allow an administrator to work independently of direct supervision and involvement of other administrators, while still maintaining a level of reliability to ensure that only those storage units, which are slated for removal and/or replacement by the data center administrators, are indeed those units that are eventually serviced.

Management of a large, diversified computing environment is typically provided by a remotely configured system management console. Openmanage Enterprise is one example of a system management console provided by Dell Technologies, which cost-effectively facilitates comprehensive lifecycle management for the computing devices of distributed computing environments from one console. While such systems management consoles have been an effective tool for remotely managing computing devices, their use with relatively large numbers of computing devices can sometimes become unwieldy.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

FIG. 1 is a block diagram of examples of components of an Information Handling System (IHS) that may be used to implement a secure storage unit replacement and locking system and method according to one embodiment of the present disclosure. Particularly, IHS 100 includes one or more processor(s) 102 coupled to system memory 104 via system interconnect 106. System interconnect 106 may include any suitable system bus. System memory 104 may include a plurality of software and/or firmware modules including firmware (F/W) 108, basic input/output system (BIOS) 110, operating system (O/S) 112, and/or application (s) 114. Software and/or firmware module(s) stored within system memory 104 may be loaded into processor(s) 102 and executed during operation of IHS 100.

F/W 108 may include a power/thermal profile data table 148 that is used to store power profile data and thermal profile data for certain hardware devices (e.g., processor(s) 102, system memory 104, non-volatile storage 134, NID 122, I/O controllers 118, etc.). System memory 104 may include a UEFI interface 140 and/or a SMBIOS interface 142 for accessing the BIOS as well as updating BIOS 110. In general, UEFI interface 140 provides a software interface between an operating system and BIOS 110. In many cases, UEFI interface 140 can support remote diagnostics and repair of computers, even with no operating system installed. SMBIOS interface 142 can be used to read management information produced by BIOS 110 of an IHS 100. This feature can eliminate the need for the operating system to probe hardware directly to discover what devices are present in the computer.

IHS 100 includes one or more input/output (I/O) controllers 118 which manages the operation of one or more connected input/output (I/O) device(s) 120, such as a keyboard, mouse, touch screen, microphone, a monitor or display device, a camera, a microphone, audio speaker(s) (not shown), an optical reader, a universal serial bus (USB), a card reader, Personal Computer Memory Card International Association (PCMCIA) slot, and/or a high-definition multimedia interface (HDMI), which may be included or coupled to IHS 100.

IHS 100 includes Network Interface Device (NID) 122. NID 122 enables IHS 100 to communicate and/or interface with other devices, services, and components that are located externally to IHS 100. These devices, services, and components, such as a system management console 126, can interface with IHS 100 via an external network, such as network 124, which may include a local area network, wide area network, personal area network, the Internet, etc.

For the purposes of this disclosure, the term "system management console" may refer broadly to systems that are configured to couple to a management controller and issue management instructions for an information handling system (e.g., computing device) that is being managed by the management controller. One example of such a system management console is the Dell OpenManage Enterprise (OME) systems management console. In various embodiments, management consoles may be implemented via specialized hardware and/or via software running on a standard information handling system. In one embodiment, a system management console may be deployed on a secure virtual machine (VM), such as a VMWARE Workstation appliance.

IHS 100 further includes one or more power supply units (PSUs) 130. PSUs 130 are coupled to a BMC 132 via an $I^2C$ bus. BMC 132 enables remote operation control of PSUs 130 and other components within IHS 100. PSUs 130 power the hardware devices of IHS 100 (e.g., processor(s) 102, system memory 104, non-volatile storage 134, NID 122, I/O controllers 118, etc.). To assist with maintaining temperatures within specifications, an active cooling system, such as one or more fans 136 may be utilized.

IHS 100 further includes one or more sensors 146. Sensors 146 may, for instance, include a thermal sensor that is in thermal communication with certain hardware devices that generate relatively large amounts of heat, such as processors 102 or PSUs 130. Sensors 146 may also include voltage sensors that communicate signals to BMC 132 associated with, for example, an electrical voltage or current at an input line of PSU 130, and/or an electrical voltage or current at an output line of PSU 130.

BMC 132 may be configured to provide out-of-band management facilities for IHS 100. Management operations may be performed by BMC 132 even if IHS 100 is powered off, or powered down to a standby state. BMC 132 may include a processor, memory, and an out-of-band network interface separate from and physically isolated from an in-band network interface of IHS 100, and/or other embedded resources.

In certain embodiments, BMC 132 may include or may be part of a Remote Access Controller (e.g., a DELL Remote Access Controller (DRAC) or an Integrated DRAC (iDRAC)). In other embodiments, BMC 132 may include or may be an integral part of a Chassis Management Controller (CMC).

Figure 2:
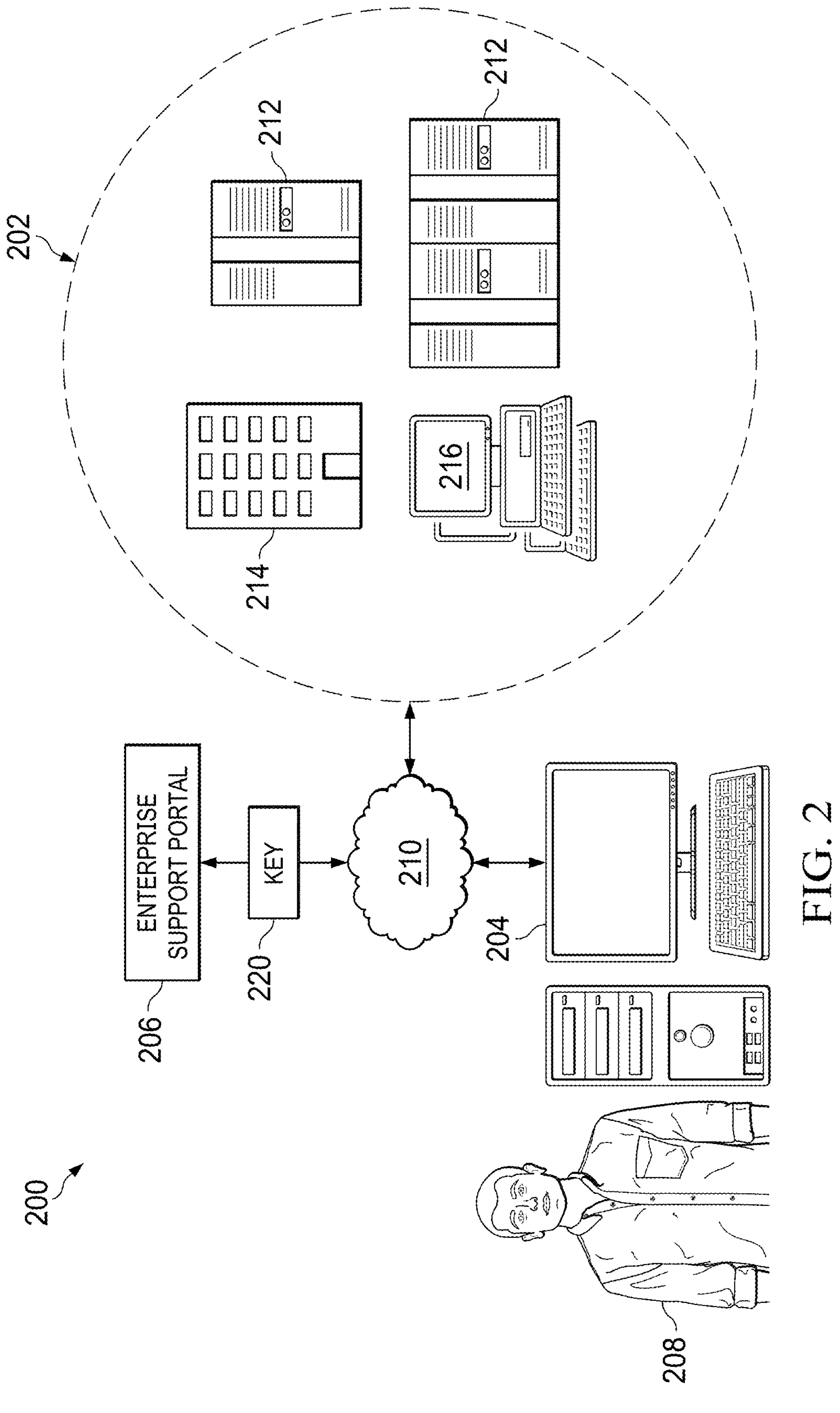
FIG. 2 illustrates an example secure storage unit replacement and locking system that may be implemented on a computing environment according to one embodiment of the present disclosure.

FIG. 2 illustrates an example secure storage unit replacement and locking system 200 that may be implemented on a computing environment according to one embodiment of the present disclosure. The secure storage unit replacement and locking system 200 generally includes a computing environment 202 that is managed by a systems management appliance 204. The secure storage unit replacement and locking system 200 also includes an enterprise support portal 206 that may be used to create a key 220 that may be used by administrators to unlock a storage unit within the computing environment 202. For example, the enterprise support portal 206 may respond to a request to obtain the key 220 from the systems management appliance 204 for various reasons, such as to satisfy the terms of a warranty agreement between the administrator of the computing environment 202 and the vendor of the IHS in which the affected storage unit is configured.

As shown, the systems management appliance 204 communicates with the computing environment 202 and the enterprise support portal 206 through a network 210. Nevertheless, it should be appreciated that the systems management appliance 204 may communicate locally with the computing environment 202 and/or the enterprise support portal 206, or form a part of the computing environment 202.

In general, the systems management appliance 204 is configured to monitor and control any number of IHSs 100 (e.g., computing devices) in the computing environment 202. In one embodiment, the systems management appliance 204 provides at least a portion of the features of the systems management console 126 described herein above. The computing environment 202 may include any type and quantity of IHSs 100, such as those that may be included in a computing cluster 212, a data center 214, or multiple computing devices 216 of an organizational entity, such as a business, or school. In a particular example, computing environment 202 may be one managed by a single entity, such as a vendor of the IHSs, or some other large organization having a first computing cluster 212 configured at a first location, a second computing cluster 212 configured at a second location, a data center 214 configured at a third location, and multiple computing devices 216 configured at a fourth location. Thus, the number and type of computing devices managed by the systems management appliance 204 can, and often does, vary widely across the computing environment that it is designed to manage. According to embodiments of the present disclosure, some, most, or all of the computing cluster 212, data center 214, computing devices 216 (collectively referred to as IHSs 100) may include one or more disk enclosures. Additional details of the disk enclosures that may be used by the IHSs 100 will be described in detail herein below.

The enterprise support portal 206 may be one that is administered by an organization, such as a corporation, school, or other enterprise that may supply client IHSs 100 to some, most, or all of its members or customers. In one embodiment, the enterprise support portal 206 may be, for example, an online support portal managed by a vendor of the IHSs 100 in which keys 220 for accessing and replacing storage units may be downloaded and used as appropriate. In one embodiment, each key 220 comprises a Quick Response (QR) code that includes information about a specific storage unit to be replaced by administrator personnel, and the information stored in the key 220 may be encrypted for security reasons. For example, the lock for a specific storage unit may only be opened by a user providing a release code (e.g., RFID tag, barcode, QR code, USB plug, etc.) that uniquely identifies the drive to pull and the replacement drive to insert. The information on the code is cryptographically signed by the vendor of the IHS to ensure integrity and reduce malicious activity. This technique ensures that only storage replacements authorized by the vendor will take place.

In another embodiment, the system 200 only allows the key 220 to be used once for removing a storage unit from its disk enclosure. Such a behavior may be useful for reducing inadvertent or illicit removal of the storage unit or other storage units in the computing environment.

Figure 3:
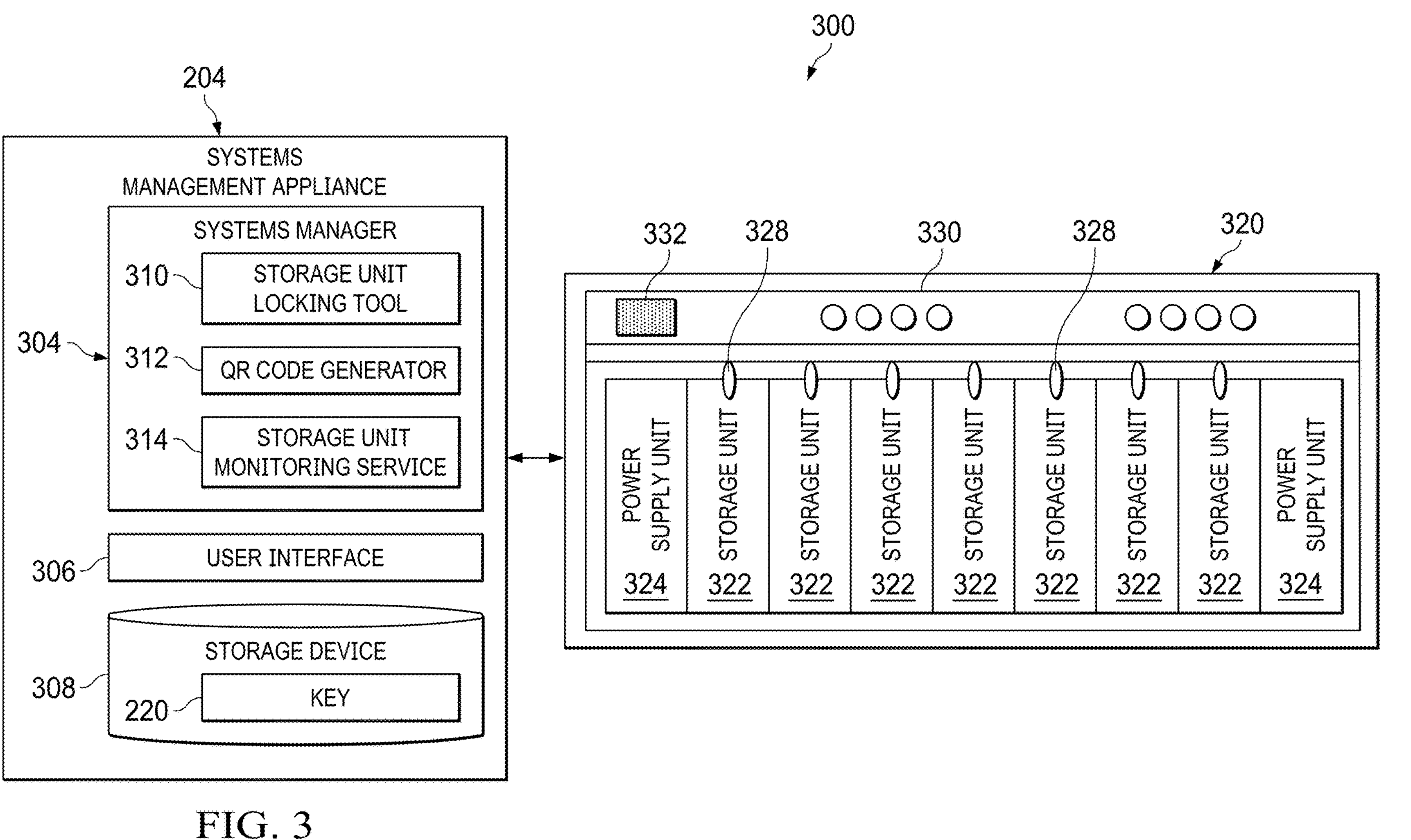
FIG. 3 is a diagram view illustrating several components of another example secure storage unit replacement and locking system according to one embodiment of the present disclosure.

FIG. 3 is a diagram view illustrating several components of another example secure storage unit replacement and locking system 300 according to one embodiment of the present disclosure. The secure storage unit replacement and locking system 300 includes a systems management appliance 204 installed with a systems manager 304, a user interface 306, and a storage device 308, and disk enclosure 320 configured with one or more storage units 322. In one embodiment, the user interface 306 provides at least a portion of the features of the systems management console 126 described herein above. The systems manager 304 monitors and controls the operation of various computing devices as described above with reference to FIG. 2. In one embodiment, systems manager 304 includes at least a portion of the Dell EMC OpenManage Enterprise (OME) that is installed on a secure virtual machine (VM), such as a VMWARE Workstation.

The systems manager 304 includes a storage unit locking tool 310, a QR code generator 312, and a storage unit monitoring service 314. The storage unit locking tool 310 includes executable instructions for performing some, most, or all of the features of the secure storage unit replacement and locking system described herein. For example, the storage unit locking tool 310 may receive a request to remove one of the hard disks from the enclosure, and using the QR code generator 312, generate a key 220 in which the key includes information for identifying the one hard disk to be removed. The storage unit locking tool 310 may also include computer-executable logic for receiving information associated with the key when the key is located at the disk enclosure, determine which one of the storage units 322 are to be unlocked by the key, and unlocking that storage unit 322 so it may be removed. While the present example embodiment is described with a QR code generator 312, it should be appreciated that in other embodiments, the QR code generator 312 may be included in the enterprise support portal 206 so that the systems manager 304 may request for, and obtain the key 220 created by the enterprise support portal 206. Additionally, it should be appreciated that, although the storage unit locking tool 310 is shown and described as an integral feature of a systems manger 304, the storage unit locking tool 310 may be implemented independently of any systems manager 304 and/or systems management appliance 204 in the computing environment 202.

The storage unit monitoring service 314 may be included for continual monitoring of certain storage units in the computing environment 202 that may be susceptible to failure and/or those that have already failed, and facilitating generation of a key 220. For example, the storage unit monitoring service 314 may monitor certain characteristics (e.g., quantity of bad sectors, Bit Error Rate (BER), level of usage, how long the storage unit has been in service, etc.) of each storage unit 322, and when such characteristics exceed a specified threshold, perform at least one of generating an alert message for the administrators of the system, and/or automatically requesting the creation of a key 220 that may be used to remove and/or replace the storage unit.

The disk enclosure 320 may be any suitable device that houses one or more storage units 322. A disk enclosure generally refers to a housing configured to house storage units, such as hard disk drives and solid state drives (SSDs). In some cases, the disk enclosure may include one or more Power Supply Units (PSUs) 324 for supplying electrical power to the storage units 322. The disk enclosure 320 may also include electro-mechanical locks 328 for each storage unit 322. While the electro-mechanical locks 328 are shown outside of the disk enclosure 320, it is contemplated that in other embodiments that the electro-mechanical locks 328 along with any associated wiring to the electro-mechanical locks 328 are configured inside of the disk enclosure 320 to reduce or eliminate the probability of illicit tampering. For example, each lock may include an actuator (e.g., solenoid, electro-mechanical servo, stepper motor, etc.) that operates under the control of the locking tool 310 to push a bolt or rod through a complementary hole configured in the side a storage unit. Thus, when the storage unit 322 is fully engaged inside the disk enclosure 320, the front portion of the storage unit 322 blocks the actuator and its associated wiring from access by users. Additionally in some embodiments, the locks 328 may be configured in a manner that, if removal of the storage unit 322 is attempted while the lock 328 is engaged, the storage unit 322 will be destroyed.

The disk enclosure 320 also includes a Local Control Panel (LCP) 330 that is configured with a key reading device 332. The LCP 330 may include a processor and a memory for storing instructions that are executed by the processor to communicate with the storage unit locking tool 310 for performing certain features of the system described herein. For example, the LCP 330 may use the key reading device 332 to read the key 220 presented by an administrator, while the administrator is in close proximity to the disk enclosure 320, and communicate with the storage unit locking tool 310 to determine which of the locks 328 are to be either actuated or de-actuated for allowing the storage unit 322 associated with the key 220 to be removed.

Figure 4:
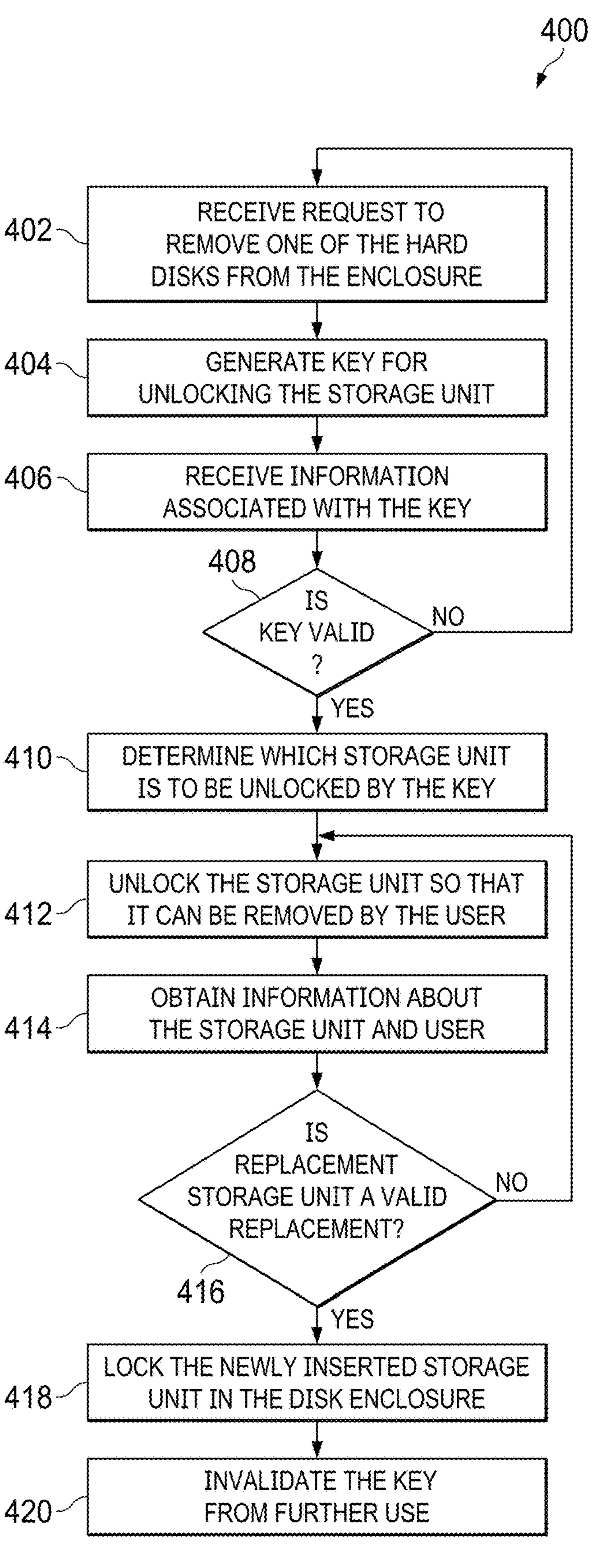
FIG. 4 illustrates an example secure storage unit replacement and locking method that may be performed to facilitate secure removal and/or replacement of the storage unit in a computing environment.

FIG. 4 illustrates an example secure storage unit replacement and locking method 400 that may be performed to facilitate secure removal and/or replacement of the storage unit in a computing environment 202. Additionally or alternatively, some, most, or all of the described steps of the secure storage unit replacement and locking method 400 may be performed by at least one of the storage unit locking tool 310, the QR code generator 312, storage unit locking service 314, and/or enterprise support portal 206. Although the present example method 400 only describes a technique for secure removal and replacement of a storage unit in a single disk enclosure, it should be appreciated that the method 400 may be used to provide secure storage unit removal and replacement of storage units 322 in multiple disk enclosures. Initially, a disk enclosure 320 is populated with one or more storage units, and is started to operationally provide storage services for a computing environment. Also, most or all of the storage units 322 are locked in their respective disk enclosures 320 via locks 328.

At step 402, the method 400 receives a request to remove one of the hard disks from the enclosure. In one embodiment, the request may be received due to user input in which a user (e.g., administrator) is manually requesting removal and/or replacement of the storage unit. For example, storage unit locking tool 310 may request that the user provide user input for identifying which storage unit is to be removed in which the identification includes an address of the disk enclosure, and the bay address where the storage unit is currently configured.

In one embodiment, the request is generated automatically by the storage unit monitoring service 314 in response to a characteristic of a storage unit that exceeds a specified threshold value. In other embodiments, the request may be generated by some other process executed by the systems manager 304.

At step 404, the method 400 generates a key 220 for unlocking the storage unit in which the key 220 includes information for identifying the one hard disk to be removed. In one embodiment, the key 220 is generated by the QR code generator 312 executed on the systems management appliance 204. In another embodiment, the QR code generator can be executed by an online support portal, such as an enterprise support portal 206. While the present embodiment describes a key embodied as a QR code, other keys may be embodied in other forms such as a bar code, or other printable indicia including information for identifying the hard disk.

In one embodiment, the key 220 may include indicia that indicates in human readable form (e.g., alpha-numeric text) for indicating to the user, which storage unit is to be removed and/or replaced. For example, the human readable indicia may include information associated with an address of the disk enclosure 320 and a bay number indicating which storage unit in the disk enclosure 320 is to be removed.

At this point, the user (e.g., administrator) takes possession of the key 220 and carries the key 220 to the disk enclosure 320 where the storage unit is located. When at the disk enclosure 320, the user may then present the key 220 to a key reading device 332 configured on the disk enclosure 320, such as one that may be configured on a LCP 330 of the disk enclosure 320. Thereafter at step 406, the method 400 receives information associated with the key. At step 408, the method 400 determines whether or not the key 220 is valid. If so, processing continues at step 410; otherwise, processing continues at step 402 to receive and process the next request to remove and/or replace a storage unit.

At step 410, the method 400 determines which one of the hard disks in the computing environment 202 is to be unlocked by the key. For example, the method 400 may decrypt the information included in the key 220, identify which storage unit is to be removed, and communicate with the storage unit's associated disk enclosure 320 to unlock the storage unit.

In one embodiment, the key 220 may include information associated with a time limit option or a time window option in which the replacement can be performed. The time limit option generally refers to a technique in which the subject storage unit is unlocked for a specified period of time (e.g., 60 seconds). That is, the method 400 may, or may not, unlock the storage unit indefinitely; rather, the storage unit may be unlocked for a reasonable period of time that allows the user to remove the currently deployed storage unit, and optionally replace it with another storage unit. The time window, on the other hand, refers to another technique in which the allowable replacement time window is specified with a beginning time and an ending time. For example, a key 220 may specify that a replacement of the storage unit can be performed on March $13^{th}$ between 8:00 PM and 10:00 PM. Certain embodiments incorporating such a technique may provide an advantage in that it ensures the replacement will be performed at a time of convenience to the computing environment to minimize any impacts that may otherwise be caused thereby. Additionally, such characteristics may be useful for reducing or eliminating a security exposure threat caused by a storage unit that would otherwise be unlocked indefinitely where others could inadvertently or illicitly remove the storage unit.

At step 412, the method 400 unlocks the storage unit so that it can be removed by the user. At this point, the user removes the storage unit, and optionally replaces it with another storage unit within the time window as described herein above with reference to step 410.

At step 414, the method 400 obtains information about the storage unit and the user (e.g., technician) who replaces the storage unit. For example, the key 220 may include storage unit information (e.g., and internal ID number stored in the storage unit's firmware or hardware by its vendor, make/model number, storage capacity, read/write speed, and the like, etc.), user identification information (e.g., badge, ID card, fingerprint, etc.) that uniquely identifies the user performing the replacement. The unique ID may be useful for ensuring a specified storage unit is used to replace the removed storage unit. For example, if the user has two storage units to replace, an explicit match can be made between the storage units so that the user does not inadvertently replace (e.g., swap) the wrong storage units. In certain cases where the replacement storage units are stored with data (e.g., the storage units are returned from having been repaired), the unique ID of the storage unit may be critical in determining which one goes where. Documented cases exist where two drives have been pulled out and improperly swapped when returned, thus causing data corruption. Embodiments of the present disclosure may provide a solution to this problem by including a unique ID of the storage unit in the key 220 so that such erroneous swaps can be reduced or eliminated.

In one embodiment, the identity of the storage unit may be obtained using a hash of its stored data (e.g., a digital signature) that can be checked once the drive is inserted, but prior to allowing the method 400 access to the data. This is to ensure that data has not been tampered with, such as due to one particular failure scenario where the user removes the storage unit, implants malware on the storage unit, and replaces the storage unit in the disk enclosure.

At step 416, the method 400 determines whether or not the replacement storage unit is a valid replacement. If so, the method continues processing at step 418 in which the newly inserted storage unit is locked in the disk enclosure 320; otherwise, processing continues at step 412 in which the bay in the disk enclosure 320 where the storage unit has been removed remains unlocked so that the user is allowed to insert a proper replacement for the removed storage unit. In one embodiment, the method 400 may generate an alarm, such as an audible signal (e.g., beeping sound) or a visual message (e.g., a pop-up window on a user interface) when an invalid storage unit has been inserted in the disk enclosure 320.

At step 418, the method 400 locks the newly inserted storage unit in the disk enclosure. Thereafter at step 420, the method 400 invalidates the key 220 from further use. That is, the key 220 may be configured to be a one-time use key so that, once it is used, it cannot be used again. Such a feature may be useful for reducing or eliminating a security threat caused by an active key that may be inadvertently or illicitly used to remove the same or other storage units from the computing environment 202.

The process described above may be repeatedly performed each time a request is received to remove and/or replace a storage unit in a disk enclosure 320. Nevertheless, when use of the secure storage unit replacement and locking method 400 is no longer needed or desired, the method 400 ends.

Although FIG. 4 describes one example of a process that may be performed to facilitate secure removal and replacement of storage units in disk enclosures, the features of the disclosed process may be embodied in other specific forms without deviating from the spirit and scope of the present disclosure. For example, method 400 may perform additional, fewer, or different operations than those operations as described in the present example. For another example, the steps of the method 400 may be performed in a sequence other than what is described above. As yet another example, the steps of the process described herein may be performed by a computing system other than systems management appliance 204, such as by an IHS 100 configured in the computing environment 202.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A secure storage unit replacement and locking system comprising:

a plurality of storage units configured in a disk enclosure, each hard disk configured with a lock to selectively restrict removal of its respective storage unit from the disk enclosure, wherein the lock is configured to destroy the storage unit when the lock is engaged while the storage unit is removed from the disk enclosure; and instructions stored in at least one memory, wherein the instructions, upon execution by at least one processor, cause the instructions to:

receive a request to remove one of the storage units from the enclosure;

generate a key, wherein the key includes information for identifying the one storage unit to be removed;

receive information associated with the key when the key is located at the disk enclosure;

determine which one of the plurality of storage units are to be unlocked by the key; unlock the one storage unit according to the determination;

receive information associated with another storage unit that has been inserted in the disk enclosure;

determine whether the inserted storage unit is valid;

lock the inserted storage unit in the disk enclosure only when the inserted storage unit has been determined to be valid; and invalidate the key after the inserted storage unit has been replaced.

2. The secure storage unit replacement and locking system of claim 1, wherein the instructions, upon execution by the processor, cause the instructions to provide the key to a user, wherein the user is configured to physically carry the key to the disk enclosure, wherein the key comprises a printable indicia.

3. The secure storage unit replacement and locking system of claim 2, wherein the instructions, upon execution by the processor, cause the instructions to receive information associated with the key by reading the key using a key reading device configured on the disk enclosure.

4. The secure storage unit replacement and locking system of claim 2, wherein the key comprises a Quick Response (QR) code.

5. The secure storage unit replacement and locking system of claim 2, wherein the instructions, upon execution by the processor, cause the instructions to cryptographically sign the key by a vendor of the IHS.

6. The secure storage unit replacement and locking system of claim 1, wherein the instructions, upon execution by the processor, cause the instructions to perform at least one of:

unlocking the one storage unit for a specified period of time, and lock the one storage unit after the specified period of time; and unlocking the one storage unit at a specified beginning time, and locking the one storage unit at a specified ending time.

7. The secure storage unit replacement and locking system of claim 6, wherein the instructions, upon execution by the processor, cause the instructions to invalidate the key after the specified period of time.

8. The secure storage unit replacement and locking system of claim 1, wherein the lock and wiring associated with the lock are inaccessible when the storage unit is operationally engaged in the disk enclosure.

9. A secure storage unit replacement and locking method comprising:

receiving a request to remove one of a plurality of storage units from an enclosure, wherein each hard disk is configured with a lock to selectively restrict removal of its respective storage unit from the disk enclosure;

generating a key, wherein the key includes information for identifying the one storage unit to be removed;

receiving information associated with the key when the key is located at the disk enclosure;

determining which one of the plurality of storage units are to be unlocked by the key;

unlocking the one storage unit according to the determination;

destroying, by the lock, the storage unit when the lock is engaged while the storage unit is removed from the disk enclosure;

receive information associated with another storage unit that has been inserted in the disk enclosure;

determine whether the inserted storage unit is valid;

lock the inserted storage unit in the disk enclosure only when the inserted storage unit has been determined to be valid; and invalidate the key after the inserted storage unit has been replaced.

10. The secure storage unit replacement and locking method of claim 9, further comprising providing the key to a user, and carrying the key, by the user, to the disk enclosure, wherein the key comprises a printable Quick Response (QR) code.

11. The secure storage unit replacement and locking method of claim 10, further comprising receiving information associated with the key by reading the key using a key reading device configured on the disk enclosure.

12. The secure storage unit replacement and locking method of claim 10, further comprising cryptographically signing the key.

13. The secure storage unit replacement and locking method of claim 9, further comprising unlocking the one storage unit for a specified period of time, and locking the one storage unit after the specified period of time.

14. A non-transitory computer program product comprising a computer readable storage medium having program instructions embodied therewith, the program instructions executable by a processor to cause the processor to perform a method comprising:

receiving a request to remove one of a plurality of storage units from an enclosure, wherein each hard disk is configured with a lock to selectively restrict removal of its respective storage unit from the disk enclosure;

generating a key, wherein the key includes information for identifying the one storage unit to be removed;

providing the key to a user, and carrying the key, by the user, to the disk enclosure, wherein the key comprises printable indicia;

receiving information associated with the key when the key is located at the disk enclosure;

determining which one of the plurality of storage units are to be unlocked by the key;

unlocking the one storage unit according to the determination;

receiving information associated with another storage unit that has been inserted in the disk enclosure;

determining whether the inserted storage unit is valid;

locking the inserted storage unit in the disk enclosure only when the inserted storage unit has been determined to be valid;

destroying, by the lock, the storage unit when the lock is engaged while the storage unit is removed from the disk enclosure;

receive information associated with another storage unit that has been inserted in the disk enclosure;

determine whether the inserted storage unit is valid;

lock the inserted storage unit in the disk enclosure only when the inserted storage unit has been determined to be valid; and invalidate the key after the inserted storage unit has been replaced.

15. The non-transitory computer program product of claim 14, wherein the program instructions are further executable by a processor to cause the processor to perform invalidating the key only when the inserted storage unit has been determined to be valid.

16. The non-transitory computer program product of claim 14, wherein the program instructions, upon execution by the processor, cause the instructions to provide the key to a user, wherein the user is configured to physically carry the key to the disk enclosure, wherein the key comprises a printable indicia.

* * * * *